United States Patent
Sitnik

(10) Patent No.: US 6,988,276 B2
(45) Date of Patent: Jan. 17, 2006

(54) IN-HOUSE TV TO TV CHANNEL PEEKING

(75) Inventor: Eran Sitnik, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/460,944

(22) Filed: Dec. 14, 1999

(65) Prior Publication Data

US 2002/0010935 A1  Jan. 24, 2002

(51) Int. Cl.
H04H 9/00 (2006.01)

(52) U.S. Cl. .............................. 725/10; 725/25; 725/74; 725/83

(58) Field of Classification Search ............... 725/9–21, 725/25–31, 74–85, 86, 87, 109; 348/8, 9, 348/1, 2, 5.5, 552; 345/327; 455/6.3, 6.1, 455/4.1, 5.1
See application file for complete search history.

(56) References Cited

U.S. PATENT DOCUMENTS

| | | | | |
|---|---|---|---|---|
| 4,989,081 A | * | 1/1991 | Miyagawa et al. | 358/93 |
| 5,089,885 A | * | 2/1992 | Clark | 725/93 |
| 5,402,419 A | * | 3/1995 | Osakabe et al. | 370/85.1 |
| 5,490,208 A | | 2/1996 | Remillard | 379/96 |
| 5,500,794 A | | 3/1996 | Fujita et al. | 364/188 |
| 5,537,141 A | * | 7/1996 | Harper et al. | 725/116 |
| 5,574,965 A | * | 11/1996 | Welmer | 725/151 |
| 5,666,363 A | * | 9/1997 | Osakabe et al. | 370/426 |
| 5,682,486 A | * | 10/1997 | Grossman et al. | 395/339 |
| 5,847,752 A | | 12/1998 | Sebestyen | 340/17 |
| 5,864,682 A | * | 1/1999 | Porter et al. | 395/200.77 |
| 5,903,878 A | * | 5/1999 | Talati et al. | 705/26 |
| 5,933,140 A | * | 8/1999 | Strahorn et al. | 345/338 |
| 5,996,008 A | | 11/1999 | Gardos et al. | 709/219 |
| 5,999,207 A | | 12/1999 | Rodriguez et al. | 348/14 |
| 6,049,823 A | * | 4/2000 | Hwang | 709/218 |
| 6,173,279 B1 | * | 1/2001 | Levin et al. | 707/5 |
| 6,505,255 B1 | * | 1/2003 | Akatsu et al. | 709/239 |
| 6,731,347 B1 | * | 5/2004 | Takano et al. | 348/558 |

FOREIGN PATENT DOCUMENTS

| | | |
|---|---|---|
| EP | 0604167 A1 | 6/1994 |
| JP | 10248020 A * | 9/1998 |
| WO | WO97/28630 | 8/1997 |
| WO | WO9859282 | 12/1998 |
| WO | WO9923789 | 5/1999 |
| WO | WO9935787 | 7/1999 |
| WO | WO9935816 | 7/1999 |
| WO | WO9935856 | 7/1999 |

OTHER PUBLICATIONS

10248020 A—Japan (Abstract).

* cited by examiner

*Primary Examiner*—Krista Bui
(74) *Attorney, Agent, or Firm*—Gregory L. Thorne

(57) ABSTRACT

A method and apparatus for providing peer-to-peer communications between televisions wherein a query request is sent from any of the televisions to any other of the televisions. The query request is for information identifying content currently watched on the queried television including samples of the currently watched content. In operation, each television is first identified to each other television. The identifying information includes determining whether a given television may receive content identifying information from each other of the televisions. In some instances, the querying television may only be allowed to receive certain types of content identifying information from the queried television. The identifying of the television is performed by either the televisions or a mediator that is separate from each of the televisions. The televisions receive information identifying what content identifying information a given other television may receive from a user of the televisions. The televisions first determine whether a given user may set and alter the content identifying information a given other television may receive by requesting identifying information from the user such as a password. When a user does not have a proper password, the television will not set and alter the content identifying information a given other television may receive.

20 Claims, 2 Drawing Sheets

IN-HOUSE TV TO TV CHANNEL PEEKING

FIELD OF THE INVENTION

This invention generally relates to a method and apparatus for sharing audio visual content. Particularly, this invention relates to a method and apparatus for connecting two or more televisions together to share identifying information about viewed audio visual content.

BACKGROUND OF THE INVENTION

As network connections, such as those using local area network (LAN) protocols, standardize and the setup and use of the network connections becomes simple for an ordinary consumer, more network connections will show up in consumer settings. At this time, there are numerous standards that are vying for acceptance for consumer network connections. These network protocols include home audio-video interoperability (HAVI), home application programming interface (HAPI), IEEE 1394 serial bus interface (firewire™, I-LINK™, etc.), Home Phoneline Networking Alliance (Home PNA), Bluetooth™, cable network protocol systems, as well as other manners of proprietary wired and wireless protocol systems. Much of the current focus on network connections is for the in-home network. Manufacturers are currently retrofitting every type of home appliance, from toasters to heating and cooling systems, for connection to an in-home network. Most of these systems are designed with a master/slave operability in mind. For instance, many systems are designed wherein a master controller, such as a television (TV) is provided with the capability to recognize and control a slave device, such as a video cassette recorder (VCR). In this model, the master sends command and control information to the slave and the slave complies with the commands and sends status information back to the master.

Another example of such a system is shown in Japanese Patent Publication Number 10248020A, to Hiyoshi ("Hiyoshi"), incorporated herein by reference. In Hiyoshi, two TV's are connected together in a master/slave configuration for the purposes of enabling a parent at a master TV to monitor what is being viewed by a child on a slave TV. In operation, the master TV receives the image data being viewed on the slave TV and displays the data on a corner part of the master TV display. However, this setup does nothing to enhance the viewing experience and does not promote a community experience as may be desired by a "connected" household.

In another prior art system shown in U.S. Pat. No. 5,490,208, to Remillard, a TV-to-TV connection via a phone line is utilized for facilitating a teleconference-like interaction. Each TV in the system is provided with a device that has speakerphone capability and can initiate a call to another TV that is provide with a similar device. After initiation of a voice mode, the users may switch to a data mode wherein image data may be exchanged. The system may switch back and forth between the modes. However, this system is proposed for adding functionality to a TV that is not related to the primary leisure function of a TV.

In a typical household, two or more separate rooms in the household have a TV. Oftentimes, a first household member may be watching the TV in a first room and is suddenly interested in what may be watched by a second household member in a second room. A husband may be curious as to what a wife is laughing about in the other room, etc. However, the only methods currently available to enable both parties to determine what is being watched by the other party is to have the interested party get up and check on the other party or to have the interested party shout out to the other party.

Accordingly, it is an object of the present invention to provide a method of enhancing the primary leisure function of a TV.

SUMMARY OF THE INVENTION

An apparatus in accordance with the present invention provides for peer-to-peer communications between televisions where a query request is sent from any of the televisions to any other of the televisions. The query request is for information identifying content currently watched on the queried television and may include a request for samples of the currently watched content. In operation, each television is first identified to each other television. The identifying information may include information as to whether each of the given televisions may receive content identifying information from each other of the televisions. In some instances, the querying television may only be allowed to receive certain types of content identifying information from the queried television. The identifying may be performed by either the televisions or a mediator that is separate from each of the televisions.

In some embodiments, the televisions may receive information identifying what content identifying information a given other television may receive. In these embodiments, the televisions may first determine whether a user is allowed to set and alter the content identifying information a given other television receives. This may be determined by the television requesting identifying information from the user. The user identifying information may include a password. When a user does not have a proper password, the television will not set and alter the content identifying information a given other television may receive.

BRIEF DESCRIPTION OF THE DRAWINGS

The following are descriptions of embodiments of the present invention that when taken in conjunction with the following drawings will demonstrate the above noted features and advantages, as well as further ones. It should be expressly understood that the drawings are included for illustrative purposes and do not represent the scope of the present invention.

The invention is best understood in conjunction with the accompanying drawing in which.

DETAILED DESCRIPTION OF THE INVENTION

Figure 1:
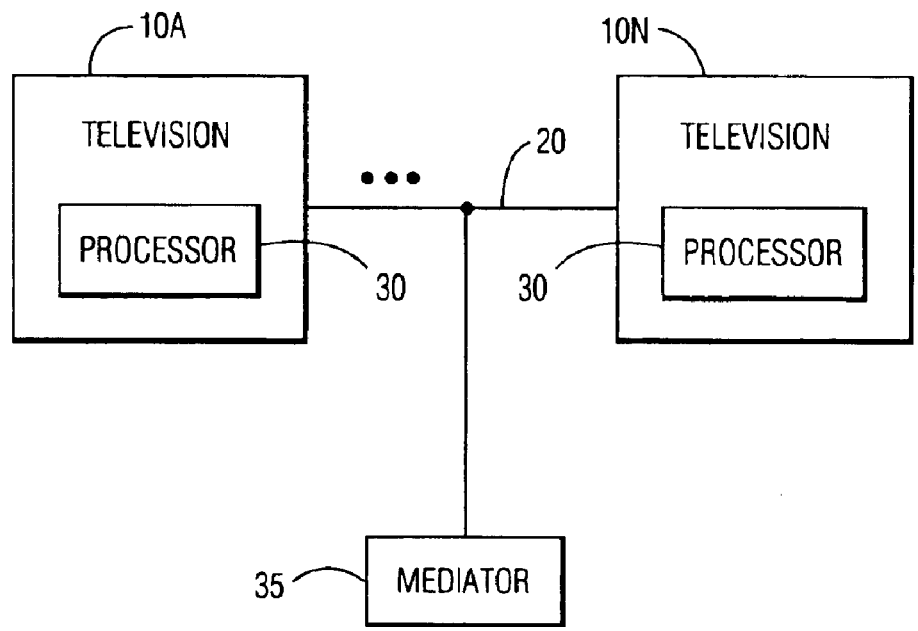
FIG. 1 shows an illustrative peer-to-peer TV system in accordance with an embodiment of the present invention.
Figure 2:
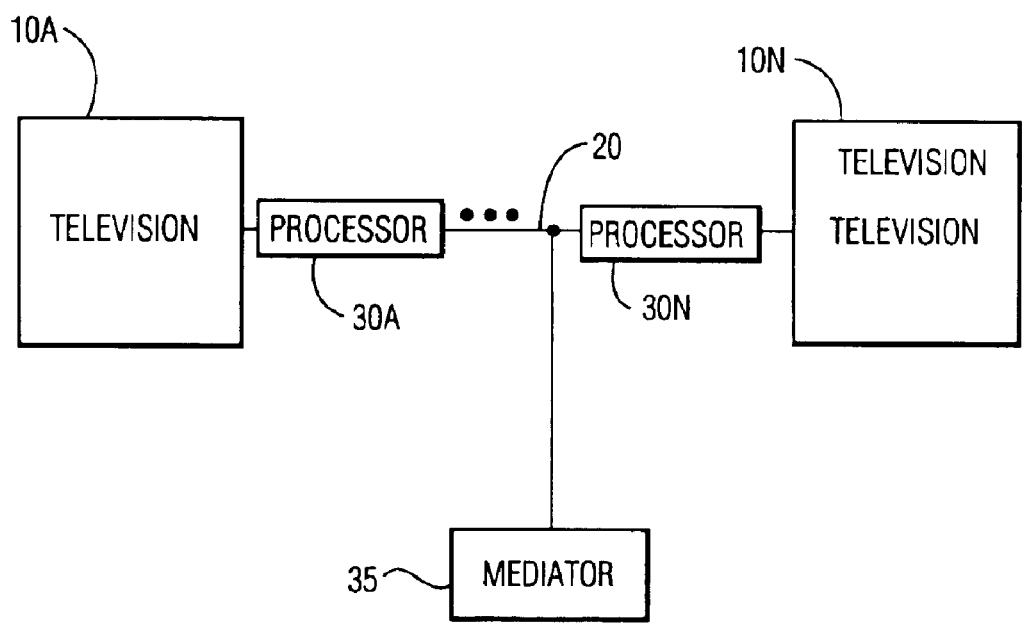
FIG. 2 shows an illustrative peer-to-peer TV system in accordance with an alternate embodiment of the present invention.

FIG. 1 shows a peer-to-peer television system in accordance with an embodiment of the present invention. As shown, televisions (TVs) 10A, . . . , 10N are interconnected via a bi-directional connection 20. The connection 20 may be any system for interconnecting devices that is capable of supporting bi-directional communications including an Internet connection, a local area network (LAN), an in-home network, etc. In this embodiment, the TVs 10A, . . . , 10N each contain a processor 30 for operating in accordance with this invention. FIG. 2 shows another embodiment of the present invention wherein processors 30A, . . . , 30N are separate from TVs 10A, . . . , 10N. In either of the embodiments shown in FIGS. 2 and 3, the processors 30 operate similarly.

Figure 3:
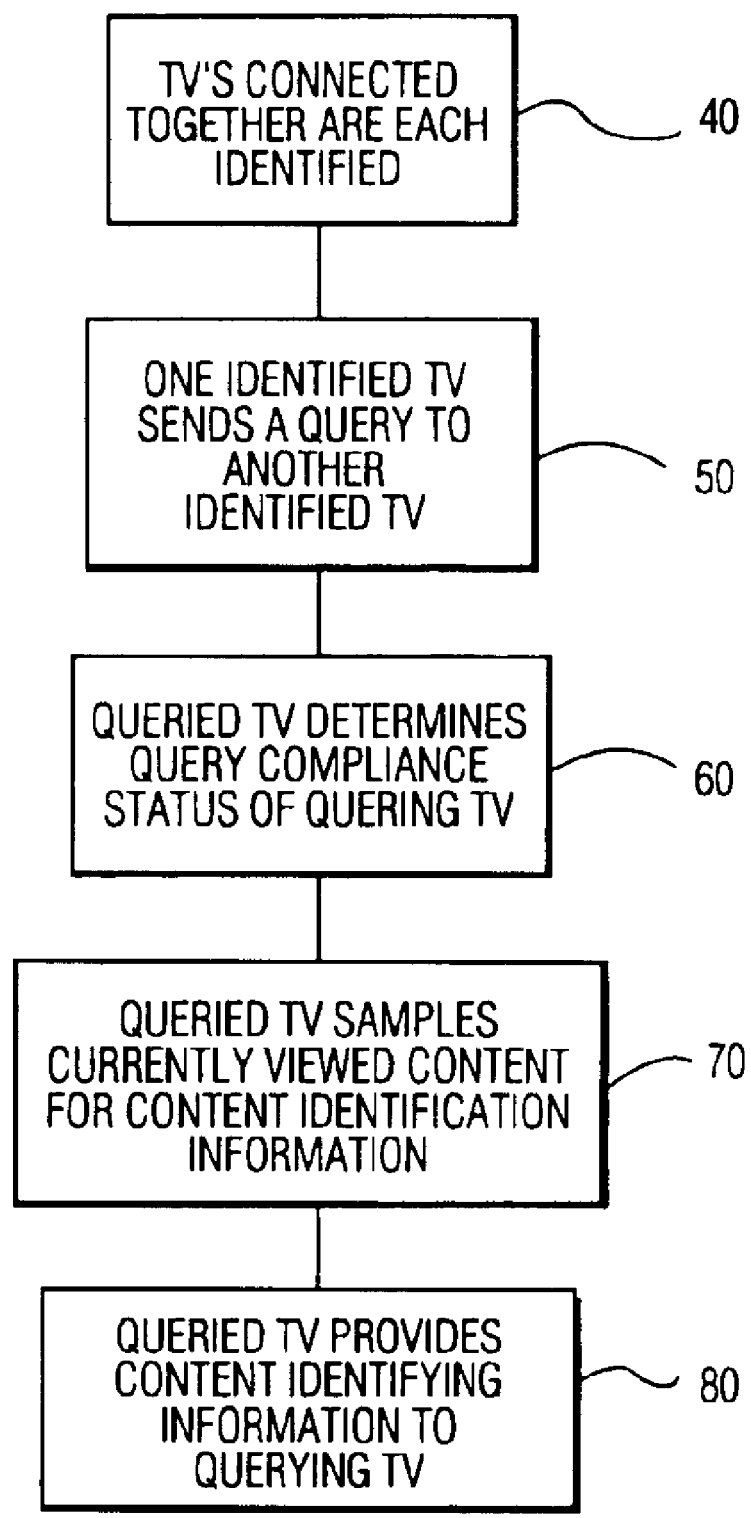
FIG. 3 shows a flow diagram of a process in accordance with an embodiment of the present invention.

FIG. 3 shows a flow diagram that together with FIGS. 1 and 2 will illustrate a particular operation in accordance with an embodiment of the present invention. In operation, sometime after the TVs 10A, . . . , 10N are interconnected, any of a registration system, query system, mediation system, etc., may be utilized for identifying the TVs 10A, . . . , 10N to each other TV as shown in act 40. During the identification process, at least one of a mediator 35, and each of the processors 30 is provided with identifying information for each of the TVs 10A, . . . , 10N. In addition, at least one of the mediator 35, and each of the processors 30 may be provided with information on the transmission capabilities of the connection 20. For example, any of the currently existing connecting systems are sufficient for the transmission of querying information and content identifying information. However, a higher transmission capability may be required to support transmission of a sample of currently viewed content as described in more detail below. Further, at this time or some future time, at least one of the mediator 35, and each of the processors 30 may be provided with information as to whether a given TV will share content identifying information with another given TV as described in more detail below.

In act 50, sometime after at least two of the TVs 10A, . . . , 10N are identified each to the other, the processor 30 from one identified TV may send a query to the processor 30 of another identified TV. The query may include a request for current channel tuning information of the queried TV, a request for current viewed content identification information, etc. In addition, in a case wherein the connection 20 can support it, the query may include a request for a current content sample from the queried TV. The content sample may include single or multiple frame(s) of currently viewed content depending on the query request and the capabilities of the connection 20.

In act 60, the processor 30 of the queried TV determines the query compliance status of the querying TV to determine whether the querying TV is enabled to receive the queried information. The query compliance information may typically be provided by a queried TV user and may be altered either freely or after complying with a security restriction by the queried TV user.

There are many instances wherein the queried TV user will not want to share content identifying information with a party watching another television in another room. For example, in a case wherein a parent is viewing content of a mature nature, the parent may choose to not have a currently viewed TV comply with a query from a TV that is being viewed by a child. During a later time, the parent may wish to change the currently viewed TV to comply with a query request. Accordingly, the query compliance status may be changed at will.

In another embodiment, a user may be required to comply with a security restriction, such as entering a password, prior to being enabled to change the query compliance status of a given TV. In this way, in a case wherein a child is watching mature content on a TV, the child can be deterred from altering the query compliance status of the given TV to not comply with a query from a parent's TV. The query compliance status may default to enabling a query from each of the TVs 10A, . . . , 10N, may default to not enabling a query from each of the TVs 10A, . . . , 10N, or may require user input to determine the query compliance status for each of the combination of the TVs 10A, . . . , 10N.

In yet another embodiment, a querying TV may only be allowed to receive certain types of queried information. For example, a parent may set a query compliance status to comply with a query for content identifying information from a child's TV. However, at the same time, the parent may also restrict the query compliance status to not comply with a request for a content sample. When a queried TV is set to not comply or not comply fully with a query request from a given querying TV, the processor 30 of the queried TV may send the current query compliance status of the querying TV. In addition, together with the query compliance status, the queried TV may also send enabled content identifying information. In another embodiment, the processor 30 of the queried TV may simply send to the querying TV any, if at all, enabled content identifying information.

In act 70, when the query compliance status of the queried TV is enabled to provide some information to a querying TV, the processor 30 of the queried TV samples the currently viewed content to determine the content identifying information requested by the querying TV. In act 80, the queried TV transmits enabled content identifying information to the querying TV. In a case wherein a request is made for multiple frame samples of the currently viewed content and the connection 20 may support it, then the processor 30 of the queried TV may begin transmitting frame samples to the querying TV while sampling further frame samples.

It should be noted that since the TVs 10A, . . . , 10N operate in a peer-to-peer mode, any queried TV that is enabled to provide information to a querying TV, will provide the queried information. Accordingly, the leisure application of the TVs 10A, . . . , 10N is thereby increased.

Finally, the above-discussion is intended to be merely illustrative of the invention. Those having ordinary skill in the art may devise numerous alternative embodiments that are within the scope of the present invention without departing from the spirit and scope of the following claims. For example, in step 60 above, although it is stated that the processor 30 of the queried TV determines the query compliance status of the querying TV, clearly the mediator 35 may perform this act. In fact, in other embodiments the mediator 35 may be responsible for other portions or all of the above-described system attributed to the processor 30. In these embodiments, the processor 30 and the TVs 10A, . . . , 10N may merely present a user interface to the user for setting the query compliance status and for initiating a query.

In addition, the connection 20 may represent a connection that exits a house (e.g., an Internet connection) as described above. Accordingly, clearly an apparatus in accordance with the present invention may provide anyone connected to the connection 20 (e.g., anyone on the Internet) with the ability to "peek" into anyone else's TV as long as the query compliance status of the queried TV is not violated. In this way, a parent may check what a child is watching while the parent is away from the household, or may check what a babysitter is watching for that mater. Relatives and others in different parts of the world may check what another relative or others are watching. With permission (e.g., a properly set query compliance status), real-time statistics, such as how many people in a town, zip code, etc., are watching channel 7 right now, may be gathered by a service provider or other. In this way, TV networks, advertisers, etc. may gain additional valuable data from the apparatus operating in accordance with the present invention. Users may be paid by the parties collecting the statistics in exchange for the users setting the query compliance status to allow gathering of the statistics.

Further, since the mediator 35 may be connected to a connection 20 that exits a household, clearly the mediator 35 may be external to a household. In this way, the mediator 35 may reside at a web site. The TVs 10A, ..., 10N may be provided with a unique TV identification number for the purposes of communicating with the web site. The web site may operate as a service provider for providing this service to users. Users may be interested in the statistical information to find out what other users are currently watching. Users may pay for this service or may enable access to their statistical information in exchange for access to other party's statistical information. Other combinations of systems may also be suitably utilized without departing from the spirit and scope of the following claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope; and d) several "means" may be represented by the same item or hardware or software implemented structure or function.

The claimed invention is:

1. A first television apparatus, comprising:

means for transmitting information, via a connection;

means for receiving information, via the connection; and a first processor associated with the transmitting means and the receiving means;

wherein the first processor is configured to provide peer-to-peer communication with a second processor of a second television apparatus via the connection to allow a first person who is watching the first television apparatus to determine what is being watched by a second person on the second television apparatus, and to allow the second person to determine what is being watched by the first person on the first television apparatus;

wherein, to allow the first person to determine what is being watched on the second television apparatus: (a) the first processor transmits a query to the second processor, via the connection, that requests information regarding content that is currently watched on the second television apparatus, and (b) the first processor is configured to receive, via the connection, the requested information regarding the content that is currently watched on the second television apparatus from the second processor;

wherein the second processor is configured to provide the requested information regarding the content that is currently watched on the second television apparatus responsive to receipt of the query from the first processor; and wherein, to allow the second person to determine what is being watched on the first television apparatus: (a) the first processor receives a query from the second processor, via the connection, that requests information regarding content that is currently watched on the first television apparatus, and (b) the first processor is configured to provide, via the connection, the requested information regarding the content that is currently watched on the first television apparatus, responsive to receipt of the query from the second processor.

2. The first television apparatus of claim 1, wherein said first processor determines whether to comply with the query from the second processor by checking query compliance status information which indicates whether the first processor is setup to share the queried information with the second processor.

3. The first television apparatus of claim 2, wherein:

said first processor is configured to receive identifying information from a user prior to enabling the user to do at least one of set and change the query compliance status information.

4. The first television apparatus of claim 2, wherein:

the query compliance status information is set so that the first processor does not comply with the query from the second processor when the second person is a child, and content that is currently watched on the first television apparatus comprises mature content.

5. The first television apparatus of claim 1, wherein said first processor is configured to provide any queried information to the second processor that does not violate a query compliance status of the second processor.

6. The first television apparatus of claim 1, wherein said connection comprises at least one of an in-home network connection and an Internet connection.

7. The first television apparatus of claim 1, wherein:

the information regarding the content that is currently watched on the first television apparatus comprises at least one of a sample thereof and an indication of a channel tuned by the first television apparatus; and the information regarding the content that is currently watched on the second television apparatus comprises at least one of a sample thereof and an indication of a channel tuned by the second television apparatus.

8. A communication system, comprising:

a plurality of respective television apparatuses interconnected together in a peer-to-peer relationship;

wherein each of said respective television apparatuses includes means for transmitting information, means for receiving information, and a processor associated with the transmitting means and the receiving means;

wherein, for each of said respective television apparatuses, the respective processor is configured to provide peer-to-peer communication with a processor of any other one of the television apparatuses to allow a first person who is watching the respective television apparatus to determine what is being watched by a second person on the any other one of the television apparatuses, and to allow the second person to determine what is being watched by the first person on the respective television apparatus;

wherein, for each of said respective television apparatuses, to allow the first person to determine what is being watched on the any other one of the television apparatuses: (a) the respective processor transmits a query to the processor of the any other one of the television apparatuses that requests information regarding content that is currently watched on the any other one of the television apparatuses, and (b) the respective processor is configured to receive the requested information regarding the content that is currently watched on the any other one of the television apparatuses from the processor of the any other one of the television apparatuses;

wherein, for each of said respective television apparatuses, the processor of the any other one of the television apparatuses is configured to provide the requested information regarding the content that is currently watched on the any other one of the television apparatuses responsive to receipt of the query from the respective processor; and wherein, for each of said respective television apparatuses, to allow the second person to determine what is being watched on the respective television apparatus: (a) the respective processor receives a query from the processor of the any other one of the television apparatuses that requests information regarding content that is currently watched on the respective television apparatus, and (b) the respective processor is configured to provide the requested information regarding the content that is currently watched on the respective television apparatus, responsive to receipt of the query from the processor of the any other one of the television apparatuses.

9. The communication system of claim 8, wherein for each of said respective television apparatuses, the respective processor determines whether to comply with the query from the processor of the any other one of the television apparatuses by checking query compliance status information which indicates whether the respective processor is setup to share queried information with the processor of the any other one of the television apparatuses.

10. The communication system of claim 9, wherein:

for each of said respective television apparatuses, the respective processor receives identifying information from a user prior to enabling the user to do at least one of set and change the query compliance status information.

11. The communication system of 9, wherein:

for each of said respective television apparatuses, the query compliance status information is set so that the respective processor does not comply with the query from the any other one of the processors when the second person is a child, and content that is currently watched on the respective television apparatus comprises mature content.

12. The communication system of claim 8, wherein:

for each of said respective television apparatuses, the respective processor is configured to provide any queried information to the processor of the any other one of the television apparatuses that does not violate a query compliance status of the processor of the any other one of the television apparatuses.

13. The communication system of claim 8, further comprising:

at least one of an in-home network connection and an Internet connection for interconnecting said plurality of television apparatuses together in the peer-to-peer relationship.

14. The communication system of claim 8, wherein:

for each of said respective television apparatuses, the information regarding the content that is currently watched on the respective television apparatus comprises at least one of a sample thereof and an indication of a channel tuned by the respective television apparatus; and the information regarding the content that is currently watched on the any other one of the television apparatuses comprises at least one of a sample thereof and an indication of a channel tuned by the any other one of the television apparatuses.

15. A method of providing communications between first and second television apparatuses, said method comprising:

connection the first and second television apparatuses together in a peer-to-peer relationship;

configuring a processor of the first television apparatus to provide peer-to-peer communication with a second processor of the second television apparatus to allow a first person who is watching the first television apparatus to determine what is being watched by a second person on the second television apparatus, and to allow the second person to determine what is being watched by the first person on the first television apparatus;

to allow the first person to determine what is being watched on the second television apparatus: (a) transmitting a query, from the first processor to the second processor, that requests information regarding content that is currently watched on the second television apparatus, and (b) configuring the first processor to receive the requested information regarding the content that is currently watched on the second television apparatus from the second processor, configuring the second processor to provide the requested information regarding the content that is currently watched on the second television apparatus responsive to receipt of the query from the first processor; and to allow the second person to determine what is being watched on the first television apparatus: (a) receiving, at the first processor, a query from the second processor that requests information regarding content that is currently watched on the first television apparatus, and (b) configuring the first processor to provide the requested information regarding the content that is currently watched on the first television apparatus, responsive to receipt of the query from the second processor.

16. The method of claim 15, further comprising identifying each of said plurality of television apparatuses to one another prior to transmitting any queries.

17. The method of claim 15, wherein further comprising:

determining, at the first processor, whether to comply with the query from the second processor by checking query compliance status information which indicates whether the first processor is setup to share the queried information with the second processor.

18. The method of claim 17, further comprising:

receiving identifying information from a user prior to enabling the user to do at least one of set and change the query compliance status information.

19. The method of claim 15, further comprising:

determining, at a mediator that is separate from first and second television apparatuses, whether the first processor should comply with the query from the second processor, by checking query compliance status information which indicates whether the first processor is setup to share the queried information with the second processor.

20. The method of claim 15, wherein:

the information regarding the content that is currently watched on the first television apparatus comprises at least one of a sample thereof and an indication of a channel tuned by the first television apparatus; and the information regarding the content that is currently watched on the second television apparatus comprises at least one of a sample thereof and an indication of a channel tuned by the second television apparatus.

* * * * *